Aug. 27, 1946.    G. E. KING    2,406,424
CONTROL SYSTEM
Filed Oct. 17, 1944
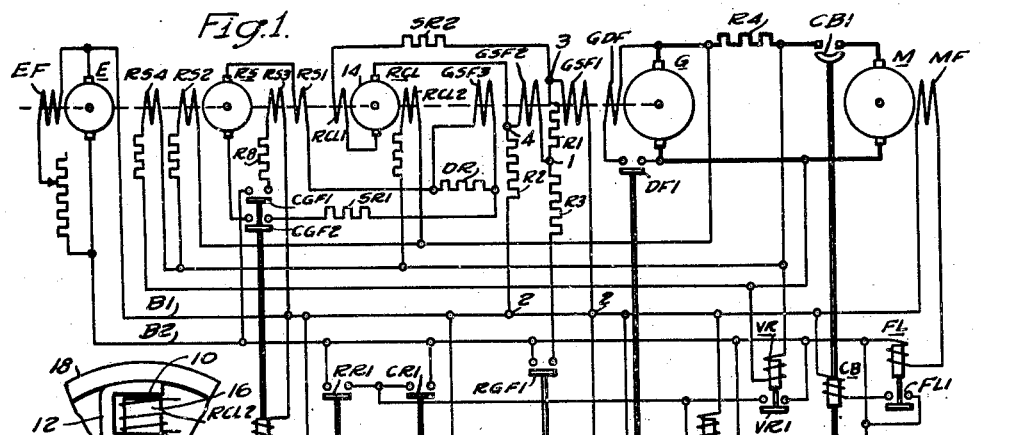
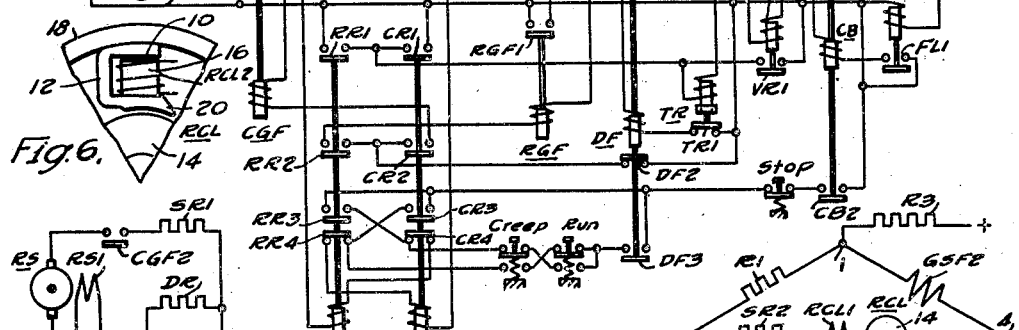
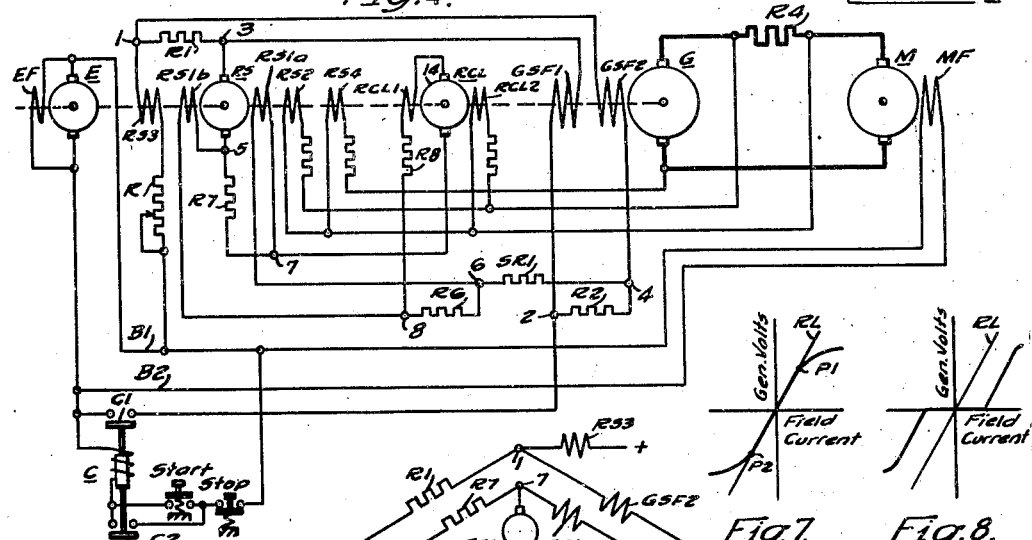
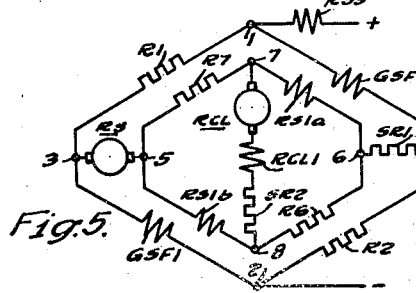
WITNESSES:
INVENTOR
George E. King.
BY
Paul E. Friedemann
ATTORNEY Patented Aug. 27, 1946

2,406,424

UNITED STATES PATENT OFFICE 2,406,424

CONTROL SYSTEM

George E. King, Swissvale, Pa., assignor to Westinghouse Electric Corporation, East Pittsburgh, Pa., a corporation of Pennsylvania Application October 17, 1944, Serial No. 559,065

10 Claims. (Cl. 172—179)

The present invention relates to variable voltage control systems and, more particularly, to electric motor control systems for operating or automatically controlling the operation of motors connected to various types of mechanical loads. In certain of its aspects this invention is related to a copending application of G. E. King and W. H. Formhalls, Serial No. 559,068, filed on the same date as this application and entitled Control systems (W. E. Case 23,453) and also to a copending application of G. E. King, Serial No. 559,066, filed on the same date as this application and entitled Control systems (W. E. Case 23,417).

This invention provides certain improvements in variable voltage control systems in which rotating regulators are employed to regulate certain electric quantities of the system, and the invention as hereinafter described and as illustrated in the drawing is specifically directed to the regulation of the speed of rotation of a direct-current motor together with provisions for limiting the motor current whether the motor is operating normally as a motor or during regenerative periods when the motor is being overhauled by its mechanical load and driven as a generator. It will be apparent to one skilled in the art that the invention is not limited to speed regulation alone since various modifications of the systems may be made to control the motor torque or power in conjunction with the current limiting features mentioned. It will further be apparent that the invention is not necessarily limited to motor control since automatic regulation of the voltage, current or electric power supplied to an electrical load of substantially any type susceptible of regulation may be had.

In one form of the invention illustrated, the variable voltage control system is particularly adapted for controlling the speed of a motor used to drive a centrifugal casting machine. Such a machine usually has fixed running and creeping speeds. After the metal is poured into the mould to be rotated, the machine is accelerated, by way of example, in 15 minutes to the running speed, at which speed it may operate for 50 minutes. The machine is then decelerated and brought to rest in approximately a 10-minute interval of time. It is then again started and brought up to creeping speed where it is operated for about 100 minutes, after which it is again brought to rest, and in due course of time the completed casting is removed.

The running speed of the centrifugal casting machine is constant and at the full field speed of the motor, driving the casting machine. Thus, speed regulation at this normal running speed by means of a rotating regulator is not essential. Current limiting control by means of a rotating regulator is, however, provided to limit the accelerating and braking current. This current limiting rotating regulator is so connected that it circulates current through the field windings of the main generator, supplying the motor whenever the main motor armature current approaches the preselected maximum value. This current is circulated in such a direction with respect to the normal supply currents circulating in these fields, that the main generator output current is limited within the preselected maximum value.

The creeping speed is very slow and may, for example, be about 1.2% of the full field speed of the main drive motor. Speed regulation of the motor at this slow speed by ordinary adjustments of the excitation of the main fields of the generator, is not practicable. To obtain this slow constant speed, a rotating regulator is used to control a separate generator field. When this control is utilized for creeping speeds, the field windings of the main generator which control the running speed are disconnected from the circuit. The rotating regulator used to limit the current in the motor functions in this capacity during acceleration and braking at both creeping and running speeds.

On some applications it is desirable to operate over a wide speed range with good speed regulation and at the same time limit the accelerating and braking current. The second form of the invention illustrated in the drawing shows a variable voltage control system of this type. In this second form of the invention the speed regulating generator, unlike that of the first-mentioned form of the invention, functions throughout the entire speed range to control the speed of the motor. It, further unlike the speed regulating generator of the first form of the invention, supplies only the corrective current to the main generator field windings with which it is connected rather than the total current necessary for exciting and regulating the main generator fields. In this second form of the invention the current limiting features, as previously described, are obtained. The current limiting rotating regulator, however, regulates directly the speed regulating generator and indirectly the main generator rather than directly as in the first form of the invention. In this second form of the invention, the two rotating regulators, that is, the speed and the current limiting rotating regulators, are connected in effective series circuit relationship. By means of this expedient there is considerable amplification of the regulating quantities thus effecting a quick response. During braking periods the main generator current is reversed. Thus, the action of the regulating generators is to tend to maintain the generator field current and prevent this field current from collapsing too fast.

In order to simplify the drawing and the accompanying descriptive disclosure, the two forms of the invention illustrated are shown without reversing facilities. Reversing may be obtained by simply adding reversing contactors. Such expedients are well known in the art and any suitable form of reversing equipment may be utilized without departing from the spirit and scope of the teachings of this invention.

A principal object of this invention is to provide a variable voltage drive including a motor in which automatic speed regulation of the motor is provided in conjunction with automatic regulation of the motor current.

Another object of this invention is to provide a variable voltage drive providing two selectively obtained constant running speeds for a motor in conjunction with current limiting protection for the motor.

Still another object of this invention is to provide a variable voltage drive of the character referred to which provides a wide range of speed regulation for a motor in conjunction with protection against excessive motor currents.

A specific object of this invention is to provide a variable voltage drive utilizing rotating regulators for regulating the speed of a motor and limiting the motor current in which the rotating regulator controlling the motor currents requires a certain value of excitation of its field windings before a corrective output thereof is obtained.

Other objects and advantages will become apparent upon a study of the following disclosure when considered in conjunction with the accompanying drawing, in which:

Figure 1 schematically illustrates a variable voltage drive providing protection against excessive currents, in which constant speeds of the motor controlled by the variable voltage system are selectively obtained;

Fig. 2 diagrammatically illustrates a detail of the invention illustrated in Fig. 1;

Fig. 3 diagrammatically illustrates another detail of the invention illustrated in Fig. 1;

Fig. 4 is a modification of the invention providing a wide range of speed control for the motor in conjunction with protection against excessive current in the system;

Fig. 5 diagrammatically illustrates a detail of the invention of Fig. 4;

Fig. 6 is a detail of one of the rotating regulators utilized in the variable voltage drives illustrated in the drawing;

Fig. 7 is a curve graphically illustrating the operating characteristics of one of the rotating regulators utilized in this invention; and Fig. 8 is a curve graphically illustrating the operating characteristics of the other rotating regulator utilized in this invention.

Referring now to Fig. 1 of the drawing, the invention illustrated therein corresponds to the first form of the invention hereinbefore generally described. It comprises a main drive motor M which is mechanically connected to drive the mentioned centrifugal casting machine (not illustrated). The armature winding of this motor is connected in series circuit relationship with the armature winding of a main generator G. A current limiting regulating generator RCL is utilized to limit the currents circulating in the series motor generator armature circuit within preselected maximum values. A speed regulating generator RS is utilized to control the electrical output of the main generator G when it is desired to operate the drive motor M at very slow or creeping speeds. An exciter E is provided to supply a constant electrical quantity to various elements of the system. The exciter E, the speed regulating generator RS, the current limiting regulator RCL and the main generator G are driven at a constant speed by any suitable constant speed prime mover or system of prime movers. As shown by way of illustration but not limitation they are connected to a common shaft to be driven by a single prime mover. The constant speed prime mover, however, is not shown in an effort to simplify the illustration of the invention.

The main motor M is provided with a single separately excited field winding MF which receives its excitation directly from the exciter.

The main generator G is provided with a differential field winding GDF which is utilized at the end of braking periods of the motor to buck-down or neutralize the residual voltage of the main generator. It is further provided with control field windings GSF1, GSF2 and GSF3. The windings GSF1 and GSF2 are connected (see Fig. 3) in opposite legs of a conventional Wheatstone bridge circuit which has as its other two opposite legs the bridge balancing resistors R1 and R2. This bridge circuit is connected at its input terminals 1 and 2 across the exciter buses B1 and B2. Thus the field windings of the main generator are excited in accordance with the exciter voltage at some constant value depending upon the value of the resistor R3. As shown in Fig. 2, the field winding GSF3 of the main generator is connected in series with the armature circuit of the speed regulating generator RS, which series circuit includes the series field winding RS1 for the speed regulating generator, which by reason of its series connection with the armature of generator RS is excited by the armature current thereof, and a resistor SR1 which is utilized to adjust the resistance of the field circuit RS1 for the speed regulating generator to impart self-energizing properties to the speed regulating generator. This series circuit also includes the contact members CGF2 of the creep contactor CGF which functions alternately with the running contactor RGF to selectively control the main generator at running or creeping speeds. A discharge resistor DR shunts the main generator field GSF3 to provide a discharge path therefor upon opening of the contact members CGF2.

The current limiting regulating generator RCL is provided with a series connected armature current excited field winding RCL1 and a control field winding RCL2. The control field winding RCL2 is energized by the drop across the resistor R4 connected in series in the main motor generator armature circuit, and thus has a voltage applied thereacross proportional to the currents flowing in the circuit and of a polarity depending upon the direction of the current flow. The series field winding RCL1 has a resistor SR2 connected in series therewith for adjusting the resistance of this field circuit, and this assembly, in conjunction with the armature member 14 of the current limiting generator, is connected across the output terminals 3 and 4 of the previously mentioned Wheatstone bridge circuit.

The speed regulating generator RS is provided with two differentially connected field windings RS2 and RS4 which are respectively connected across the resistor R4 in the motor generator series armature circuit and the motor armature terminals. Pattern field winding RS3 provides the control pattern voltage for the speed regulating generator. It is connected across the exciter buses B1 and B2 by the contact members CGF1 of the creep generator field contactor CGF. The winding RS1 for the speed regulating generator, as previously described, is series connected and the generator is of the self-energizing type.

The exciter E, as illustrated, is provided merely with a shunt field winding EF. Any suitable field winding system for this machine may be utilized since per se it forms no part of this invention.

The control equipment, which cooperatively functions to provide selectively obtained operations of the system as well as functioning in part to protect the system, comprises a main circuit breaker CB of the single-pole type for opening the main motor armature circuit on power failure, overload and loss of motor shunt field. Creep relay CR and run relay RR are provided for selecting the creeping or running speeds. Creep generator field contactor CGF and run generator field contactor RGF are provided respectively for energizing the circuits for the main generator fields GSF3, GSF1 and GSF2 for obtaining the creeping and running speeds of the motor. Differential field relay DF is provided for closing the field circuit for the field winding GDF of the main generator G to neutralize the generator residual voltage and prevent the motor from creeping. A time relay TR is provided to time the operation of the DF relay. A voltage relay VR is provided to prevent the operation of the relays TR and DF until the generator voltage has dropped to a low value. A field loss relay FL has its coil connected in series in the bus B2 and thus senses a loss of exciting current for the motor field winding MF. Creep and Run push buttons, so designated in the drawing, respectively control the energization of the CR and RR relays to effect creeping and running speeds of the motor. A Stop push button, so designated in the drawing, is provided to deenergize either of the creep or run relays depending upon which is energized at the instant the Stop button is depressed.

The relay FL has one set of contact members FL1 which control the energization of the operating coil of the main circuit breaker CB. The main circuit breaker CB has a set of main contacts CB1 which, when closed, complete the series motor generator armature circuit. It also is provided with an auxiliary contact CB2 which when closed, in conjunction with the Stop push button and either the contact members RR3 or CR3, establishes holding circuits for either the RR or CR relays. The voltage relay VR is provided with one set of contact members VR1 which when closed establish a holding circuit for the timing relay TR. This circuit is effective only during running speeds of the motor since when the motor is operating at creeping speeds the voltage across the motor armature terminals is of such a low value that this relay does not pick up. The relay TR is provided with one set of contact members TR1 which, when closed, connect the operating coil of the relay DF across the exciter buses B1 and B2. The relay DF is provided with three sets of contact members DF1, DF2 and DF3. The contact members DF1 when closed complete the field circuit for the differential field winding GDF of the main generator. The contact members DF2, which are back contacts, function in conjunction with either the contact members RR2 or CR2 to energize either the CGF or RGF relays depending upon whether the CR or RR relay is picked up. The contact members DF3 when closed function in conjunction with the Stop push button, the contacts CB2, either the Creep or Run push buttons depending upon which is depressed and the CR4 or RR4 contacts, also depending upon which of the Creep or Run push buttons are depressed, to deenergize either the RR or CR relays. The run generator field relay RGF is provided with a single contact RGF1 which, as previously described, when closed energizes the Wheatstone bridge circuit and as follows energizes the main generator field windings GSF2 and GSF1 to operate the motor at its running speed. The creep relay CR is provided with a plurality of contacts CR1 to CR4. Contacts CR1 when closed provide an energizing circuit for the timing relay TR across the exciter buses B1 and B2; the contact members CR2 when closed provide, in conjunction with the back contact members DF2, an energizing circuit for the creep generator field contactor CGF across the exciter buses B1 and B2; the contact members CR3 when closed complete, in conjunction with the contact members CB2 of the main circuit breaker CB, the Stop push button and the contact members RR4, a holding circuit for the operating coil of the creep relay CR; and finally the contact members CR4 which function in a similar capacity to the contact members RR4. The run relay RR is provided with a similar group of contacts as the relay CR. These contacts are numbered RR1 to RR4 and function in a capacity similar to that of the contacts of the creep relay. The creep generator field contactor CGF is provided with the contact members CGF1 and CGF2. The contact members CGF1 connect the pattern field winding RS3 of the speed regulating generator RS across the exciter buses B1 and B2. The contact members CGF2, as hereinbefore described, complete the circuit for the creep generator field winding GSF3 across the speed regulating generator RS.

Before proceeding with the discussion of the operation of the control system, an understanding of the function and characteristics of the regulating generators RCL and RS should be had. Both of these generators as illustrated are series generators. The following discussion is directed to the generator RS. In Fig. 7 of the drawing the saturation curve of a series generator is drawn. Stable operation of a series generator is obtainable only if the resistance of the field circuit is less than that of a line tangent to the saturation curve, that is, tangent to the initial substantially straight line portion of the saturation curve. If the resistance is higher the generator voltage cannot build up. If the resistance is lower the generator open circuit voltage will be that determined by the intersection of the line with the saturation curve. If the resistance line of the field circuit is as designated by RL in Fig. 7 the generator can theoretically have an open circuit voltage equal to the ordinate of any of the points of tangency, for example, the points P1 and P2.

While this would be undesirable in a standard generator, it is an ideal characteristic for a regulating generator since then the purpose of the control field windings, that is, the pattern field RS3 and the differentially connected windings RS2 and RS4, becomes that of locating the proper operating point of a series generator including a series armature current excited field and armature, keeping this operating point constant and supplying the required amount of power to the connected field windings of the main generator. With the resistor R8 in the pattern field circuit selected to provide the desired exciting current in the pattern field RS3, and the circuit closed, voltage in the regulating generator armature rises rapidly because the excitation of the pattern field RS3 is added to the effect of the series field. This voltage excites the generator field GSF3 causing voltages to appear across the differentially connected fields RS2 and RS4 which, if the selected speed of the motor is correct, a resulting differential voltage neutralizes the pattern field. The regulating generator thus reaches a steady point of operation because there is no forcing of the fields and due to the self-energizing properties of this generator the series field can just maintain this steady state condition.

As previously noted, the speed of the motor is to be regulated at creeping speed, thus, an indication of the counter voltage of the motor is desired, since, the counter voltage indicates the departure in speed of the motor from the desired value. This is obtained by connecting the field winding RS4 across the motor armature terminals to be energized by the voltage drop across these terminals, and by connecting the field winding RS2 across the resistor R4 in series in the motor generator armature circuit. In this manner the field winding RS4 has applied thereacross a voltage proportional to the motor armature terminal voltage and the field winding RS2 has applied thereacross a voltage proportional to the load current of the motor armature. When the motor is operating at normal speed the excitation of the field winding RS4 is greater than the excitation of the field winding RS2. By having the field winding RS4 differentially connected with respect to the field winding RS2, the differential voltage resulting from the differential action of the field windings RS2 and RS4 neutralizes the action of the field winding RS3. Thus the excitation of the main generator field winding GSF3, which is utilized for operating the motor at creeping speeds, is maintained at a constant value.

Considering now an increase in load of the motor M causing its speed to drop, it will be apparent that the motor armature terminal voltage will drop while at the same time the motor armature current will rise. This causes the excitation of the field winding RS2 connected across the resistor R4 to increase, while at the same time the excitation of the field winding RS4 is decreasing. The differential voltage thus obtained is smaller than the pattern voltage. As a result the excitation of the speed regulating generator is increased to increase the excitation of the generator field winding GSF3 to bring the motor up to a speed indicated by the pattern voltage. The speed thus increases until the action of the differentially connected fields again neutralizes the pattern field and generator RS due to the self-energizing properties thereof again maintains this new condition. At this time the speed is exactly the same as before the load on the motor changed because the regulating generator can be at balance only if the magnetomotive forces of the pattern and differentially connected fields thereof are neutralized.

If the speed of the motor rises, the converse of the above-discussed function obviously takes place.

The current limiting regulating generator RCL has self-energizing properties similar to those of the speed regulating generator. In addition, this regulating generator requires a certain value of excitation of its field circuit before an electrical output thereof occurs. In Fig. 6 a single field pole of the machine is illustrated to show the manner in which this function is obtained. As will be apparent from Fig. 1, this generator has but a single control field winding for the reason that such a single control field winding is all that is required in the instant application. It will, however, be apparent that any suitable number of field windings functioning, for example, in the manner of those of the speed regulating generator RS may be provided for different applications. In order to provide current limiting control for the motor some means must be employed to effect operation of the current limiting regulating generator RCL only when the load current exceeds a safe maximum value. To accomplish this the regulating generator RCL is given special characteristics such as illustrated graphically in Fig. 8. This characteristic differs from that of the speed regulating generator RS by having an extended low voltage or zero voltage interval which extends equally on both sides of the ordinate designated generator volts. A characteristic of this type can be obtained by providing the field poles of the generator with a magnetic shunt such as 12 in Fig. 6 which saturates at a smaller flux density than the main field pole 16. Numeral 14 designates a portion of the rotor spaced from the field pole by a small arcuate air gap, and numeral 10 designates a non-magnetic insert in the circuit of the field pole which, in effect, provides a small air gap. The pole structure comprises a base portion in good magnetic contact with the stator 18 and a pole shoe portion 20 adjacent to the armature. The windings of the generator are arranged on the main pole 16. The air gap formed by the non-magnetic insert 10 carries both the pole and the shunt magnetic flux, and hence does not influence the division of the flux. It primarily determines the low or zero voltage interval previously mentioned, and the slope of the characteristic curve beyond the low voltage interval. Because of this gap, substantially all the flux flows through the magnetic shunt since the reluctance of this path is low and almost none of it is forced across the motor generator armature circuit to generate a voltage as long as the field excitation of RCL2 is insufficient to saturate the magnetic shunt. The magnetic shunt 12 is so proportioned that it saturates at an excitation corresponding to the termination of the low or zero voltage interval and then becomes unable to carry more flux. Consequently, after the saturation of the magnetic shunt, an increasing field excitation forces flux across the air gap to the armature so that now a voltage is generated. The action after the magnetic shunt has saturated is similar to that of the speed regulating generator RS.

By connecting the series connected armature 14, the self-energizing field winding RCL1 and the tuning resistor SR2 across the output terminals 3 and 4 of the conventional Wheatstone bridge circuit it is possible to control the excitation of the main generator field windings GSF1 and GSF2 in such a manner that the current circulating in the series motor generator armature circuit never exceeds a preselected maximum value. For example, if the current in the motor generator series circuit should rise beyond the preselected maximum value, the drop across the resistor R4 and, consequently, the voltage across the control field winding RCL2 for the current limiting regulating generator, is sufficient to produce an electrical output of this machine. By properly determining the polarity of the various elements connected in the conventional bridge circuit, the output current of this generator is circulated through each of the field windings GSF1 and GSF2 of the main generator in a direction opposite to that supplied by the exciter E. As a result the excitation of these fields is reduced, and the voltage output, and consequently the current in the motor generator armature circuit is reduced to a safe value.

The operation of the system may be described as follows. Upon starting of the prime motor (not shown) the various generators of the system are rotated at a constant speed. Rotation of the armature of the exciter E causes a voltage to be applied across the exciter buses B1 and B2. As a consequence the motor field winding MF is energized. When the exciter voltage builds up the field loss relay FL closes closing the circuit to the circuit breaker CB under voltage release coil. The circuit breaker now closes connecting the motor armature to the main generator armature. With building up of the exciter voltage the differential field relay DF, connected across the exciter buses through the contact members TR1, picks up and connects the generator differential field across the generator armature to neutralize the residual generator voltage.

Pressing the Run push button completes a circuit from the exciter bus B2 through the contact members CB2 of the main circuit breaker, the Stop push button, the contact members DF3, the back contact members of the Run push button, the normally closed contact members of the Creep push button, the contact members CR4 of the creep relay CR and the coil of the run relay RR, to the exciter bus B1. The run relay thus picks up, closing its contact members RR1, RR2, RR3 and opening its contact members RR4. Closing of the contact members RR1 causes the TR relay to pick up, opening its back contact members TR1 which drops out the differential relay DF. When the differential relay DF drops out its contact members DF2 close, establishing a circuit through these contact members and the contact members RR2 for the coil of the relay RGF across the exciter buses B1 and B2. Energization of the relay RGF closes the contact members RGF1 thereof which complete the connection of the input terminals 1 and 2 of the Wheatstone bridge circuit across the exciter buses B1 and B2 and energizes the run generator fields GSF1 and GSF2. The generator voltage builds up circulating a current through the motor armature circuit, the motor starts, and the current increases in value until it approaches the maximum set by the current limiting regulating generator RCL. As the generator voltage increases, the voltage relay VR picks up forming with its contact members VR1, now closed, a holding circuit for the timing relay TR. If during this interval, the current builds up in the motor generator armature circuit to a value above the preset maximum value, the current limiting regulating generator RCL will produce a voltage having an electrical current which circulates in the bridge circuit in such a direction as to decrease the excitation of the generator fields GSF1 and GSF2 thus controlling the maximum value of current in the motor generator circuit. As the motor approaches the running speed the accelerating current diminishes and the current limiting regulating generator ceases to function.

Pressing the Stop push button drops out relay RR and as a consequence, the relay RGF, thus disconnecting the bridge circuit from the exciter and deenergizing the generator field windings GSF1 and GSF2. The generator voltage decreases until it is less than the counter voltage of the motor. The motor then generates a current in the reverse direction through the generator trying to drive it as a motor and speed up the motor generator set. When the regenerative current approaches the preset maximum value, the current limiting regulating generator again circulates a current in the bridge circuit through the generator fields which this time tends to maintain the generator voltage and prevent it from collapsing too rapidly and thus limits the maximum regenerative current. As the motor approaches zero speed the voltage relay VR drops out deenergizing the operating coil of the TR relay. After a time delay the TR relay drops out and energizes through its contact members TR1 the differential field relay DF, thus connecting the generator differential field across the generator armature bringing the generator voltage down near zero and causing the motor to stop.

Pressing the Creep button causes the creep relay CR, time relay TR, differential field relay DF and creep generator field contactor CGF to operate in their sequence. These circuits are substantially the same as those traced in connection with the running operation of the variable voltage drive and hence are not again traced. The contactor CGF when closed energizes the pattern field RS3 of the speed regulating generator through its contact members CGF1 and completes the circuit for the field winding of the main generator GSF3 to the armature of the speed regulating generator RS. The speed regulating generator armature circulates a current through the connected generator field GSF3 and the generator voltage builds up starting the motor. It should be noted that the current limiting regulating generator is free to limit the accelerating and regenerative current by means of the bridge-type circuit, as previously described. If the creeping speed is very low there will not be sufficient generator voltage to pick up the VR relay. Thus the timing relay is held in only through the contact members CR1 which effect its energization. Thus when the Stop push button is depressed to bring the motor to rest, the timing relay after a short time delay drops out and applies the differential field GDF by means of the DF relay to neutralize the residual voltage of the main generator G.

The embodiment of the invention illustrated in Fig. 4 corresponds to the second form of the invention generally discussed in the opening paragraphs of this specification. This embodiment again utilizes the speed controlling and current limiting regulating generators discussed in connection with Fig. 1 of the drawing. Hence a further description of these machines and their characteristics is believed unnecessary in connection with Fig. 4.

The variable voltage drive of Fig. 4 is, as previously mentioned, adapted to provide a wide range of speed control for the motor. This is accomplished by utilizing the electrical output of the speed regulating generator for regulating purposes only. That is, only corrective current is supplied to the control field windings GSF1 and GSF2 of the main generator by this speed regulating generator. Thus the speed may be varied over a considerably wider range before saturation of this relatively small machine occurs.

Referring now to Figs. 4 and 5, the main generator G now is provided with but two control field windings GSF1 and GSF2. The current limiting regulating generator RCL, like that of Fig. 1, again has the series armature current excited field RCL1 and the control field RCL2. The speed regulating generator RS, like that of Fig. 1, has the differentially connected voltage and current responsive field windings RS4 and RS2, respectively, and a pattern field RS3. Unlike Fig. 1 this generator is provided with two series armature current excited fields RS1a and RS1b which function as does the single field of the RS generator of Fig. 1 to impart self-energizing properties to the machine.

The manner in which the regulating generators are connected in the system is readily observed in Fig. 5. Here the main generator field windings are again connected in the opposite legs of the Wheatstone bridge circuit with the resistors R1 and R2 forming the other two legs. The pattern field winding RS3 is connected in series with a speed controlling rheostat R from the positive exciter bus B1 to the input terminal 1 of this bridge circuit. It thus, upon pressing of the Start push button and closing of the contacts C1 of the contactor C which is held in at the contacts C2, is energized by a current indicative of the current flowing in the bridge circuit which current is indicative of the selected speed of operation of the motor M. Thus the pattern excitation of the speed regulating generator is established. Each of the self-energizing field windings RS1a and RS1b are connected in opposite legs of a second Wheatstone bridge circuit which has for its other two legs the resistors R6 and R7. One armature terminal of the speed regulating generator RS is connected to the input terminal 5 of the second bridge circuit, and the other armature terminal is connected to the output terminal 3 of the first bridge circuit. The resistor SR1, which establishes the desired resistance of the self-energizing field circuit, is connected between the other input terminal 6 of the second bridge circuit and the other output terminal 4 of the first bridge circuit. The armature of the current limiting regulating generator RCL, its series connected armature current excited field winding RCL1 and the series resistor SR2 for this circuit are connected across the output terminals 7 and 8 of the second bridge circuit. Thus in a manner similar to the speed regulating generator the current limiting regulating generator supplies only corrective current to the series field RS1a and RS1b of the speed regulating generator.

The operation of this system is as follows. Depressing the Start push button energizes the contactor C which then closes its contacts C1 and C2. Closure of contact members C2 provides a holding circuit for this contactor until the Stop push button is operated. Closure of the contact members C1 completes the energizing circuit for the bridge network containing the generator field windings GSF1 and GSF2 and starts the motor. The motor then begins to accelerate to a speed determined by the setting of the rheostat R. During this accelerating period the motor armature currents are high and the armature terminal voltage relatively low. As a result, the differential voltage resulting from the differential action of the differentially connected fields RS2 and RS4 is insufficient to neutralize the pattern voltage. An electrical output of the generator RS thus follows, which is circulated in such a direction through the fields GSF1 and GSF2 as to increase their excitation. In other words, the generator RS forces the fields of the main generator G to rapidly accelerate the motor. If the motor is driving a substantial mechanical load, the armature currents will in all probability, at least during the early portions of the accelerating period, rise above the maximum value determined by the characteristics of the current limiting regulating generator RCL. This machine thus generates a voltage having a current which is circulated in the second electrical bridge circuit in a direction to reduce the excitation of the series armature current excited fields RS1a and RS1b of the generator RS to thus reduce this generator's amplifying characteristics and consequently, its electrical output. As follows, its forcing action on the generator fields GSF1 and GSF2 decreases and the main generator voltage drops. This continues until the armature currents of the motor are within permissible values and thereafter the current is maintained substantially at this constant level throughout the accelerating period. Thus a heavily loaded motor may be accelerated in the minimum possible time without the possibility of overloading the system elements.

When the Stop button is pressed, the energizing circuit for the bridge network is opened at contacts C1, thereby deenergizing the pattern field RS3 and also removing this source of excitation for the main generator field windings GSF1 and GSF2. If under these conditions the motor is overhauled by the load to which it is connected, the motor functions as a generator and tends to drive the generator as a motor. Since the pattern field RS3 has been deenergized, the excitation resulting from the yet energized fields RS2 and RS4 now acting cumulatively reverses the electrical output of the regulating generator RS to reversely excite the main field windings GSF1 and GSF2. As follows the main generator voltage rapidly drops and tends to build up in the opposite direction to thus in effect aid the regenerative action of the motor. The current limiting generator RCL again functions to produce an electrical output in such a direction as to oppose the currents circulating in the self-excited fields RS1a and RS1b. With increasing currents the electrical currents of the RCL generator are greater in magnitude than those of the RS generator. Thus the current in the series fields RS1a and RS1b reverses and consequently the current in the fields GSF1 and GSF2 is reversed. The excitation of the generator fields is now therefore in a direction to maintain the generator voltage thereby preventing regenerative currents in excess of the preset maximum value.

The variable voltage drives of this invention provide automatic overload current protection which results not in a time wasting shutdown of the system but which limits the currents within permissible values, providing maximum acceleration of the motor for the given mechanical load it is driving. Further, this automatic overload protection is provided by means of a simple, small rotating regulator which requires a minimum of maintenance effort and which, for the most part, eliminates the complications of relay or contactor systems which function in this capacity.

The foregoing disclosure and the showings made in the drawing are merely illustrative of the principles of this invention and are not to be interpreted in a limiting sense. Numerous modifications of the variable voltage drives as well as the system elements are possible, the results of which may be predicted from the teachings of this disclosure. The only limitations are to be determined from the scope of the appended claims.

I claim as my invention:

1. In a variable voltage drive, the combination of, a motor, a main generator for energizing said motor, field windings for said generator, an electrical bridge circuit, means for supplying electrical energy to the electrical bridge circuit, two of the field windings for said main generator being connected in opposite legs of the bridge circuit, a first regulating generator responsive to electrical quantities of said motor for regulating the electrical output of said main generator, a second regulating generator responsive to the electrical current supplied to said motor by said main generator for controlling the excitation of said field windings in said bridge circuit to prevent excessive motor currents, and means for rendering said regulating generator ineffective to regulate said current until a predetermined maximum current value is reached.

2. In a variable voltage drive the combination of, a motor, a main generator for energizing the motor, field windings for the main generator, an electrical bridge circuit, means for supplying electrical energy to the electrical bridge circuit, certain of the field windings of the main generator being connected in opposite legs of the electrical bridge circuit such that the ampere turns in each leg are equal, a first regulating generator responsive to electrical quantities of the motor for controlling the excitation of said certain of the field windings, a second regulating generator responsive to the motor armature currents for controlling the first regulating generator, and means for rendering the second regulating generator ineffective to control the first regulating generator until a maximum motor armature current is reached.

3. In a variable voltage drive, the combination of, a motor, a main generator for energizing said motor, field windings for said main generator, an electrical bridge circuit, two of the field windings for said main generator being connected in opposite legs of said bridge circuit, means for supplying electrical energy to said bridge circuit, a first regulating generator responsive to selected electrical quantities of said motor for controlling the electrical output of said main generator, a second regulating generator having field poles and magnetic shunts shunting the field poles which magnetic shunts saturate at lesser flux densities than the field poles, field windings associated with said field poles, said second regulating generator having the characteristic of producing abruptly increasing electrical outputs upon saturation of the magnetic shunt, means for energizing the field windings of the second regulating generator in dependence of the magnitude of the electrical current supplied to said motor by said main generator, and circuit means connecting said second regulating generator to effect a control of said main generator for limiting the electrical output thereof to a predetermined value.

4. In a variable voltage drive, the combination of, a drive motor, a main generator for energizing the drive motor, field winding means for the main generator, means for supplying a constant electrical current to a first portion of the field winding means, a regulating generator having an electrical output controlled in accordance with certain electrical quantities of the motor for energizing a second portion of the field winding means, and means for selectively utilizing the regulating generator and the means for supplying a constant electrical current to control said main generator.

5. In a variable voltage drive, the combination of, a drive motor, a main generator for energizing the drive motor, field winding means for the main generator, means for supplying a constant electrical current to a first portion of the field winding means, a first regulating generator having an electrical output controlled in dependence of certain electrical quantities of the motor for energizing a second portion of the field winding means, means for selectively utilizing the first regulating generator and the means for supplying a constant electrical current to control said main generator, a second regulating generator including at least one control field winding, means for providing electrical properties in the second regulating generator such that said field winding must be excited above a predetermined minimum value before an electrical quantity is generated, means for energizing the control field winding in dependence of an electrical quantity of the motor, and circuit means connecting said second regulating generator with said first portion of the field winding means for the main generator.

6. In a variable voltage drive, the combination of, a motor, an armature winding and a field winding for the motor, a main generator, an armature winding and a plurality of control field windings for the main generator, circuit means connecting the armature winding of the main generator and the armature winding of the motor in series circuit relationship, an electrical bridge circuit, two of said plurality of control field windings for the main generator being connected in opposite legs of the electrical bridge circuit, a first regulating generator, an armature current excited voltage sustaining field winding and a plurality of control field windings for the first regulating generator, circuit means connecting two of the control field windings of the first regulating generator in the series armature circuit of the main generator and motor to be energized in accordance with different electrical quantities thereof, a second regulating generator, an armature current excited voltage sustaining field winding and a control field winding for the second regulating generator, field poles for the windings of the second regulating generator, magnetic shunts of lesser cross-sectional dimension than the field poles, shunting said field poles; circuit means connecting the control field winding of the second regulating generator in the series armature circuit of the main generator and motor to be energized in accordance with an electrical quantity thereof, circuit means for electrically connecting said first regulating generator to energize a third control field winding of the main generator, circuit means connecting the second regulating generator across the output terminals of the electrical bridge circuit, means for supplying electrical energy to a third control field winding of the first regulating generator, to the electrical bridge circuit and to the field winding of the motor; and means for selectively connecting said first regulating generator and said electrical bridge circuit to said means for supplying electrical energy.

7. In a variable voltage drive, the combination of, a motor, an armature winding and a field winding for the motor, a main generator, an armature winding and a plurality of control field windings for the main generator, circuit means connecting the armature winding of the main generator and the armature winding of the motor in series circuit relationship, an electrical bridge circuit, two of the control field windings of the main generator being connected in opposite legs of the electrical bridge circuit, a first regulating generator, an armature current excited voltage sustaining field winding and a plurality of control field windings for the first regulating generator, two of the control field windings being differentially connected, circuit means connecting one of said differentially connected windings to be energized in accordance with the voltage drop across the motor armature, circuit means connecting the other of the differentially connected windings to be energized in accordance with the electrical current traversing the series armature circuit of the main generator and motor, a second regulating generator, an armature current excited voltage sustaining field winding and a control field winding for the second regulating generator, field poles for the windings of the second regulating generator, magnetic shunts of lesser cross-sectional dimension than the field poles, shunting the field poles; circuit means connecting the control field winding of the second regulating generator to be energized in accordance with the electrical current traversing the series armature circuit of the main generator and motor, circuit means electrically connecting the first regulating generator to energize a third control field winding of the main generator, circuit means connecting the second regulating generator across the output terminals of the electrical bridge circuit, means for supplying electrical energy to a third control field winding of the first regulating generator, to the electrical bridge circuit and to the motor field winding; and means for selectively connecting the third field winding of the first regulating generator and the electrical bridge circuits to said means for supplying electrical energy.

8. In a variable voltage drive, the combination of, a motor, a main generator for energizing the motor, a pair of control field windings for the main generator, a first electrical bridge circuit, said pair of control field windings for the regulating generator being connected in opposite legs of the electrical bridge circuit, a first regulating generator, said first regulating generator being controlled in accordance with electrical quantities of said motor, circuit means including a second electrical bridge circuit connecting said first regulating generator across the output terminals of the first electrical bridge circuit, a pair of armature current excited field windings for the first regulating generator, said armature current excited field windings forming opposite legs of the second electrical bridge circuit, a second regulating generator connected across the output terminals of the second electrical bridge circuit, and means for controlling the second regulating generator in dependence of an electrical quantity of the motor.

9. In a variable voltage drive, the combination of, a motor, a main generator for energizing the motor, a pair of control field windings for the main generator, a first electrical bridge circuit, said pair of control field windings for the regulating generator being connected in opposite legs of the electrical bridge circuit, a first regulating generator, said first regulating generator being controlled in dependence of electrical quantities of said motor, circuit means including a second electrical bridge circuit connecting said first regulating generator across the output terminals of the first electrical bridge circuit, a pair of armature current excited field windings for the first regulating generator, said armature current excited field windings forming opposite legs of the second electrical bridge circuit, a second regulating generator having field poles and magnetic shunts for the field poles of smaller flux capacity than the field poles, control windings on the field poles, said second regulating generator being connected across the output terminals of the second electrical bridge circuit, and means for energizing the control windings of the second regulating generator in dependence of an electrical quantity of the motor.

10. In a variable voltage drive, the combination of, a motor, an armature winding and a field winding for the motor, a main generator, an armature winding and a pair of control field windings for the main generator, circuit means connecting the armatures of the main generator and motor in series circuit relationship, a first electrical bridge circuit, said pair of control field windings for the main generator being connected in opposite legs of the electrical bridge circuit, a first regulating generator, a pair of armature current excited voltage sustaining field windings and a plurality of control field windings for the first regulating generator, a second electrical bridge circuit, said pair of armature current excited field windings forming opposite legs of said second electrical bridge circuit, said first regulating generator being connected in series with the second electrical bridge circuit across the output terminals of said first electrical bridge circuit, a second regulating generator, an armature current excited voltage sustaining field winding and a control field winding for the second regulating generator, said second regulating generator being connected with the armature current excited field winding thereof across the output terminals of the second electrical bridge circuit, means for exciting two of the control field windings of the first regulating generator in dependence of certain of the electrical quantities of said motor, means for exciting the control field winding of the second regulating generator in accordance with an electrical quantity of the motor, and means for supplying direct current of constant value to a third control field winding of the plurality of control field windings for the first regulating generator, to the first electrical bridge circuit and to the motor field winding.

GEORGE E. KING.